(12) United States Patent
Mani et al.

(10) Patent No.: US 12,493,102 B2
(45) Date of Patent: Dec. 9, 2025

(54) CONFIGURABLE HYSTERESIS MODULE

(71) Applicant: TEXAS INSTRUMENTS INCORPORATED, Dallas, TX (US)

(72) Inventors: Anil Mani, Bangalore (IN); Sandeep Rao, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 288 days.

(21) Appl. No.: 17/700,240

(22) Filed: Mar. 21, 2022

(65) Prior Publication Data

US 2023/0296724 A1 Sep. 21, 2023

(51) Int. Cl.
| | |
|---|---|
| *G01S 7/02* | (2006.01) |
| *G01S 13/82* | (2006.01) |
| G01S 7/292 | (2006.01) |
| G01S 13/26 | (2006.01) |
| G01S 13/34 | (2006.01) |

(52) U.S. Cl.
CPC .............. *G01S 7/023* (2013.01); *G01S 7/021* (2013.01); *G01S 13/82* (2013.01); *G01S 7/2922* (2013.01); *G01S 13/26* (2013.01); *G01S 13/343* (2013.01)

(58) Field of Classification Search
None
See application file for complete search history.

(56) References Cited

U.S. PATENT DOCUMENTS

| | | | |
|---|---|---|---|
| 8,150,325 B1 * | 4/2012 | Prichard | H04B 1/525 |
| | | | 342/27 |
| 2016/0232917 A1 * | 8/2016 | Bradley | G10L 21/0364 |
| 2023/0296724 A1 * | 9/2023 | Mani | G01S 13/343 |
| | | | 342/156 |

FOREIGN PATENT DOCUMENTS

| | | | | | |
|---|---|---|---|---|---|
| CN | 113925479 A | * | 1/2022 | ............ | A61B 5/05 |
| JP | 2017161377 A | * | 9/2017 | ........... | G01S 7/4873 |

* cited by examiner

*Primary Examiner* — William Kelleher
*Assistant Examiner* — Ismaaeel A. Siddiquee
(74) *Attorney, Agent, or Firm* — Michael T. Gabrik; Frank D. Cimino

(57) ABSTRACT

A frequency-modulated continuous wave (FMCW) radar system is presented. The FMCW radar system includes a receiver configured to receive a radar reflection signal. The radar system further includes an interference detection module, which is configured to identify a portion of the radar reflection signal corresponding to the time period during which the radar reflection signal exceeds a threshold. The FMCW radar system further includes a hysteresis module configured to adjust the identified portion of the radar reflection signal based on the portion of the signal and a hysteresis configuration. The FMCW radar system further includes a mitigation module configured to mitigate interference based on the output of the hysteresis module.

20 Claims, 5 Drawing Sheets

CONFIGURABLE HYSTERESIS MODULE

BACKGROUND

Multiple radars operating simultaneously in a limited region have the potential to interfere with each other. This simultaneous operation can cause degradation in signal-to-noise ratio, potentially masking small objects, as well as cause ghost objects to appear. For frequency modulated continuous wave (FMCW) radar systems, this interference typically manifests itself over a short window of time within a chirp, and it is desirable to know when the interference occurs so that mitigation and/or avoidance techniques can be applied.

Current radar systems identify interference by measuring the variation of the power in the signal band during a chirp. While such systems measure the interference directly as it is happening, the measurements are corrupted by the presence of reflected signals also present in the signal band due to the desired operation of the radar.

SUMMARY

A frequency-modulated continuous wave (FMCW) radar system is presented herein. The FMCW radar system includes a receiver configured to receive a radar reflection signal. The radar system further includes an interference detection module, which is configured to identify a portion of the radar reflection signal corresponding to the time period during which the radar reflection signal exceeds a threshold. The FMCW radar system further includes a hysteresis module configured to adjust the identified portion of the radar reflection signal based on the portion of the signal and a hysteresis configuration. The FMCW radar system further includes a mitigation module configured to mitigate interference based on the output of the hysteresis module.

Additionally, a method of operating an integrated circuit is disclosed. The method includes receiving an indication of a portion of a radar reflection signal corresponding to a time period during which the radar reflection signal exceeds a threshold. The method further includes adjusting the identification based at least in part on the first portion of the radar reflection signal and a hysteresis configuration. The adjusted identification is then provided to a mitigation module configured to mitigate interference.

Further, an integrated circuit is disclosed, which includes a processor and memory. The memory stores instructions, which, when executed by the processor, cause the integrated circuit to perform a method, including receiving an indication of a portion of a radar reflection signal corresponding to a time period during which the radar reflection signal exceeds a threshold. The method further includes adjusting the identification based at least in part on the first portion of the radar reflection signal and a hysteresis configuration. The adjusted identification is then provided to a mitigation module configured to mitigate interference.

BRIEF DESCRIPTION OF THE DRAWINGS

Embodiments of the present technology will be described and explained through the use of the accompanying drawings in which.

Figure 1:
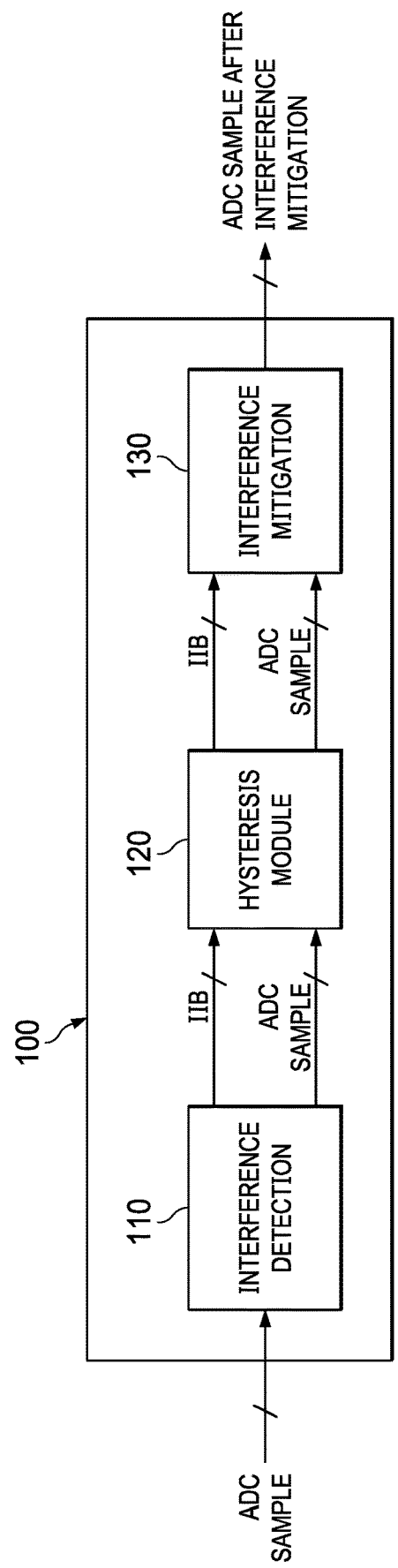
FIG. 1 is a block diagram of an implementation.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Technology is disclosed herein that improves the functioning of FMCW radar systems. Degradation in signal-to-noise (SNR) in radar systems, such as an FMCW radar system (which may be found in automotive radar systems, for example) may occur due to interference introduced by multiple radar systems operating simultaneously. In implementations, interference detection can be tailored to a particular scenario in order to effectively identify interference. This interference can then be mitigated.

Looking at FIG. 1, interference handling system 100 includes interference detection module 110, hysteresis module 120 and interference mitigation module 130. In an implementation, interference handling system 100 can be realized on an integrated circuit, such as a System On a Chip (SOC), or an integrated circuit with elements specially configured to operate interference handling system. Alternatively, interference handling system 100 may be spread across several devices, for example, with the interference detection 110 and hysteresis module 120 each on separate integrated circuits that are configured to operate in harmony.

Interference detection module 110 can detect potential interference in many different ways. U.S. Pat. No. 11,137,476, issued Oct. 5, 2021, and titled "Interference Detection in a Frequency Modulated Continuous Wave (FMCW) Radar System," describes some such methods to detect interference, and is incorporated herein by reference.

In an implementation, interference detection module 110 receives a radar reflection signal, such as the output of an analog to digital converter (ADC) that processes a radar receiver signal. In an implementation, the received signal in a FMCW radar system is a generally smoothly varying signal. At times another radar signal may interfere with the FMCW radar of interest. This interfering signal can cause a glitch in the otherwise generally smoothly varying signal. This glitch can be detected, for example, by a threshold detection scheme. For each sample of the digitally sampled radar reflection signal, an Interference Indicator Bit (IIB) can be set. Thus, in an implementation, two signals leave interference detection module 110—a digital radar reflection signal and an IIB signal. In some instances, these signals can be correlated, such that each IIB corresponds directly with a digital sample of the radar reflection signal. The IIB signal can be realized as a flag bit that is set during each sample of the radar reflection signal in which the signal exceeds a threshold. During samples when the radar reflection signal is within the threshold, the IIB "flag" is not set. For example, the IIB may be set to a 1 when an interference is identified, such as by a sample exceeding a threshold, and the IIB may be left at 0 when interference is not identified.

While an interference threshold is called out as a method to detect interference, many different techniques may be used. For example, the threshold may be a simple amplitude threshold (either in voltage, frequency, amplitude etc.), or may be a time varying or frequency varying threshold that is configured to match the expected response of the FMCW radar system. The interference detection may be based, at least in part, on the initial signal sent out by the radar system, utilizing an understanding of the radar reflection system that is expected to be returned.

Interference detection module 110 can transfer the radar reflection signal, together with the IIB signal to hysteresis module 120. Hysteresis module 120, in an implementation, can adjust the IIB signal, as will be discussed in more detail with regard to FIG. 2. In an implementation, the IIB signal sent from interference detection module 110 to hysteresis module 120 serves to identify a portion of the radar reflection signal corresponding to a time period during which the radar reflection signal exceeds a threshold. Hysteresis module 120 can adjust the samples of the radar reflection signal that correspond to interference. For example, hysteresis module may change some of the IIB signal. In an implementation, where the IIB is realized as a flag bit corresponding to samples of the radar reflection signal, the hysteresis module may change some of the IIB flags from 0 to 1 or from 1 to 0, essentially marking some samples of the radar reflection signal as interference that were not so marked by interference detection module 110, or removing the marking of some samples that were previously marked as interference.

In some cases, this adjustment may be planned in advance, based on the expected response (and expected interference) of a designed radar system. The hysteresis configuration may be adjustable before or during operation by a user. In other implementations, hysteresis module 120 may be designed to automatically adjust hysteresis configuration based on features of the radar reflection signal, or other inputs.

Both the radar reflection signal and the IIB signal are then forwarded to interference mitigation module 130. These signals may be realized as a single signal, with samples of the radar reflection signal together with corresponding IIBs, for example. Alternatively, the signals may remain separate, but correlated. Interference mitigation module 130 can then process the radar reflection signal and the IIB signal in order to mitigate the interference. This mitigation could involve zeroing out of all samples of the radar reflection signal that correlate to interference, for example. If hysteresis module 120 sets interference flags for each sample of the radar reflection signal, each sample that is set with a positive flag for interference may be zeroed out prior to processing of the radar reflection signal. Note that the samples flagged by hysteresis module 120 may not correlate exactly with the samples flagged by interference detection module 110. In an implementation, hysteresis module 120 may change some interference flags from a flag of interference to no flag of interference. The flagged samples may then be zeroed out in interference mitigation module 130. Thus, some samples that were flagged by interference detection module 110 as corresponding to interference may remain after interference mitigation module 130 deletes the interference samples. In an embodiment, interference mitigation module 130 may mitigate interference by reducing the importance of the flagged interference, or some other method.

Following the processing of the interference mitigation module 130, the mitigated radar reflection signal is forwarded out of interference handling system 100, such as to the radar processing system.

Figure 2:
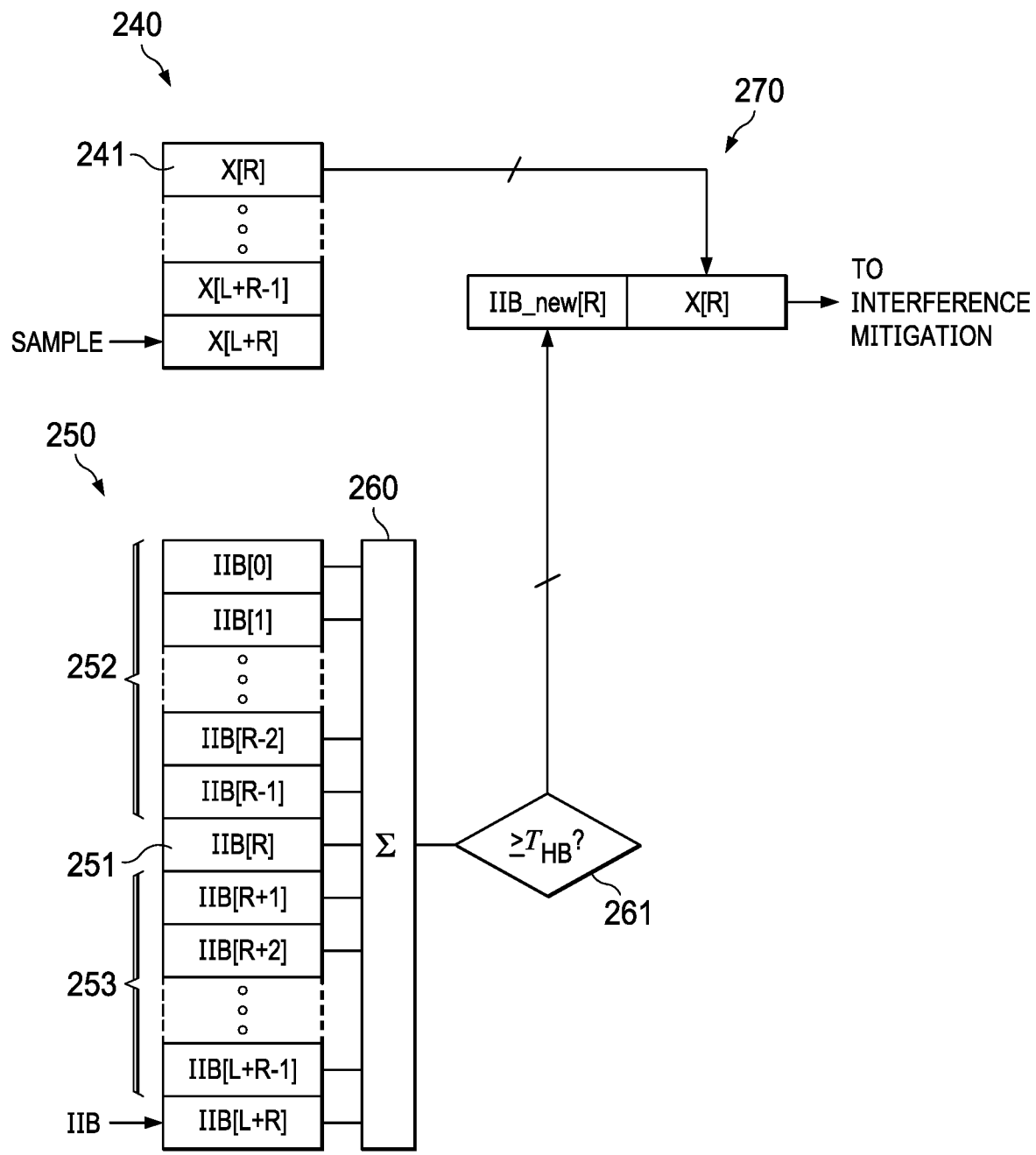
FIG. 2 is a functional diagram of an implementation.

FIG. 2 illustrates an implementation of the functionality of the hysteresis module. The hysteresis module receives a digitally sampled radar reflection signal into signal buffer 240. The hysteresis module also receives a digital IIB signal into an IIB buffer 250. While this depiction shows separate signals and separate buffers, these signals and buffers could be combined. Similarly, a digital implementation is described, but an analog implementation could also be utilized, in which either the hysteresis module digitally samples the signals, or the analog signals are processed in analog.

The sample buffer 240 and IIB buffer 250 can be realized with a First In First Out (FIFO) buffer on an integrated circuit, for example. In an implementation, the digitally sampled radar reflection signal enters sample buffer 240. The sample buffer may be configurable, either manually or automatically, at start-up or during operation. The size of the sample buffer can be set to correlate with the size of IIB buffer 250, such that active sample 241 will correlate in time with active IIB 251.

In an implementation, the digital IIB signal enters IIB buffer 250. IIB buffer can also be configurable. For example, as shown in FIG. 2, IIB buffer 250 buffers R+L+1 samples. R and L here can represent the number of samples before and/or after the active sample within the buffer. For example, L may refer to the number of samples that occurred in time before the active sample, and R may refer to the number of samples that occurred after active sample. This may cause a delay between the receipt of the active sample and the processing in order to populate the buffer. This delay may be at least equivalent to R samples. When active IIB 251 is processed, an analysis block 260 may analyze the buffered IIBs, including right-side buffered IIBs 252, active IIB 251 and left-side buffered IIBs 253. This analysis could be, for example, a summation of the IIBs. In an implementation in which the IIBs are realized as a single-bit digital signal, this summation could be adding up all of the 1s held in IIB buffer 250. This sum can then be compared to a threshold in IIB threshold comparator 261. The output of IIB threshold comparator 261 can then become the adjusted IIB for the active sample, and is stored in output buffer 270 together with the active sample 241 from the reflected radar signal.

Each digital sample of the output can then be forwarded from output buffer 270 to an interference mitigation module. Note that while FIG. 2 depicts the output as a combined digital signal including both the digitally sampled reflected radar signal and the adjusted digital IIB signal, these signals may be provided to the interference mitigation module separately, in analog form, or in some other way.

Figure 3:
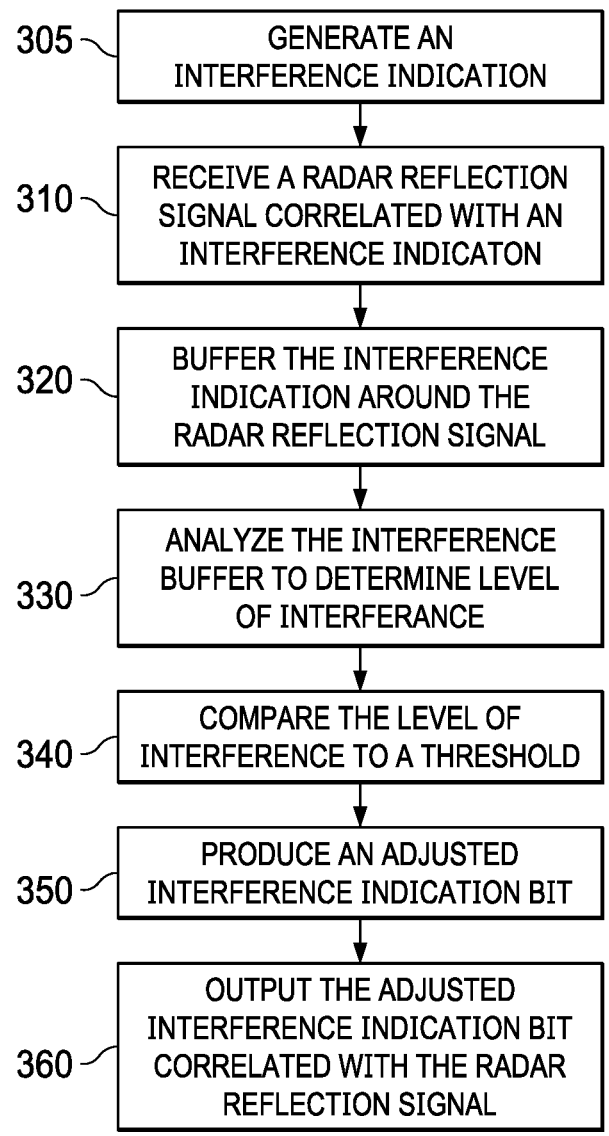
FIG. 3 is an operational sequence of an implementation.

Turning to FIG. 3, an operational sequence of an implementation is shown. In step 305, an interference indication is produced. In an implementation, this indication is produced within an interference detection module, such as interference detection module 110. This indication may also be produced within a hysteresis module, such as hysteresis module 120, or in another location. The indication of interference can correspond to a period of time during which a radar reflection signal exceeds a threshold. This threshold may be a simple threshold within the radar reflection signal, such as a frequency threshold or an amplitude threshold, for example. The threshold may be a more complex threshold, for example a threshold involving a frequency processed radar reflection signal compared to an expected frequency processed signal. Alternatively, an interference detection signal may be used to identify that the threshold is exceeded. For example, interference detection module 110 may perform the complex (or simple) threshold analysis, producing an interference detection signal that corresponds in time with the radar reflection signal. This interference detection signal can then be compared with a simple (or complex) threshold to determine whether a threshold has been exceeded in the radar reflection signal.

In step 310, a radar reflection signal correlated with an interference indication is received. As discussed above, this radar reflection signal may be a digitally sampled signal. The radar reflection signal and interference indication may be correlated by inserting a flag bit, or interference indication bit, into each digital sample of the radar reflection signal. The radar reflection signal may be part of an engineered radar system, such as on an automated driving system, or it may be an individual radar signal. In the case of the automated driving system, for example, the design of the system may specifically be accounting for a number of expected interference signals, and the ability to configure the thresholds and buffer sizes may be important to this process. Alternatively, it may be very important to be able to adjust the buffer sizes and thresholds on-the-fly to accommodate varied types and amounts of interference. This could be done manually or automatically according to an algorithm.

In step 320, a set of values of the interference indication arranged in time around a given sample of the radar reflection signal is buffered. For example, the digital IIBs correlating to the time before, corresponding to, and after the radar reflection signal sample can be buffered. The number of samples before and after the radar reflection signal sample can be configurable. In some case, the design of the system, or the interference experienced by the radar system may only utilize IIB samples before or after the active sample, not both. In many cases, samples both before and after the radar reflection signal sample will be buffered.

In step 330, the buffered IIBs are analyzed to determine a measure of interference associated with the active sample. As discussed above, this may be a summation of the buffered bits. Alternatively, this analysis may include a more detailed analysis, such as analyzing the shape of the signal, trending of the signal and/or IIB values, etc.

The measure of the level of interference determined in step 330 is compared to a threshold in step 340. While this is shown as separate from step 330, the analysis and comparison to a threshold in some cases may be intertwined. In an implementation, the simple sum of the IIBs in the buffer can be compared to a numerical threshold.

An adjusted IIB is then produced. For example, if the sum of the interference IIBs in the buffer exceeds the threshold, then the active IIB can be set to indicate interference, regardless of whether the active IIB was originally set to indicate interference. Likewise, if the sum of the IIBs in the buffer does not exceed the threshold, then the active IIB can be set to indicate no interference, regardless of the original setting.

The adjusted interference indication is then provided as output, correlated with the radar reflection signal. For example, the IIB incorporated into the digital sample of the radar reflection signal can be updated to match the adjusted IIB and provided to an interference mitigation module.

Figure 4:
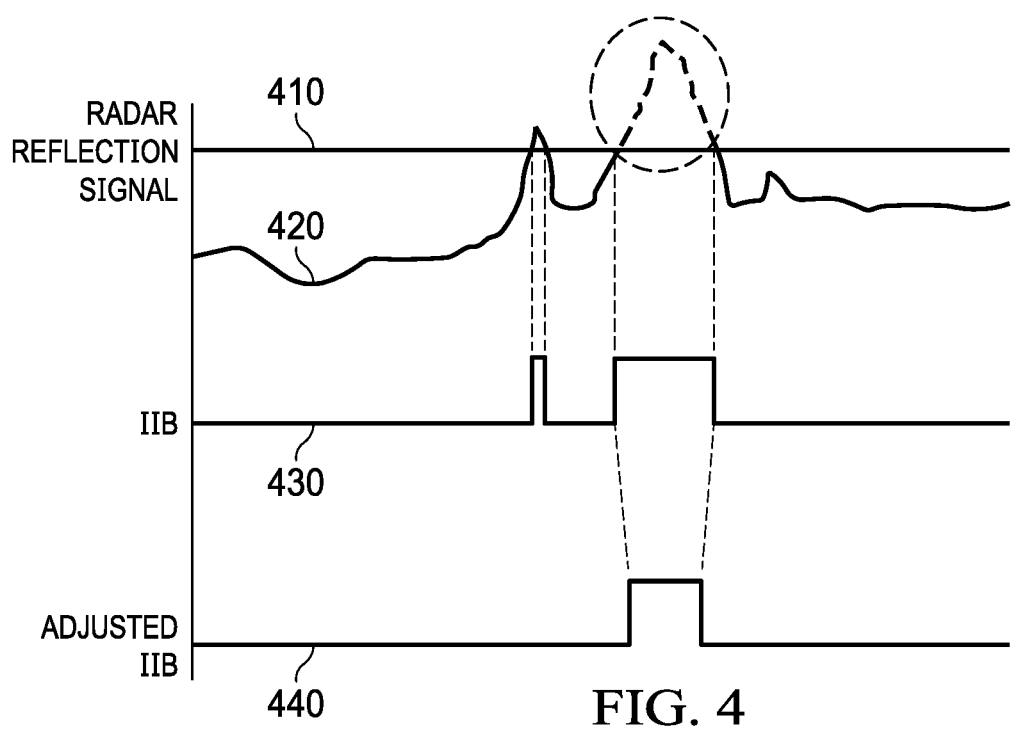
FIG. 4 is a graphical depiction of an implementation.

In FIG. 4, an implementation is presented. Radar reflection signal 420 is shown crossing interference threshold 410 in several places. Note that radar reflection signal may be a direct radar reflection signal, or a processed radar reflection signal. For example, radar reflection signal 420 may be normalized to a waveform prior to processing. This may relate to the signal that is broadcast to create the radar reflection signal. For example, if a radar signal is broadcast as a triangle waveform, the reflected radar signal may be normalized to a triangle waveform.

When the radar reflection signal 420 crosses over the interference threshold 410, IIB signal is set. This is shown in IIB input 430. In an implementation shown in FIG. 4, interference threshold 410 is set relatively low, such that IIB signal is set relatively easily and frequently resulting in false positive interference detection. The hysteresis configuration can be set to reduce some of the spurious interference indications. For example, the L and R buffer size may be set to 2 samples each. Thus, the total number of IIB samples analyzed may be 5. The IIB threshold comparator can be set to 2. At least two samples out of 5 would need to be associated with an interference indication for the IIB output 440 to be set. As shown in FIG. 2, the adjusted IIB (IIB output 440) would show fewer indications of interference.

Figure 5:
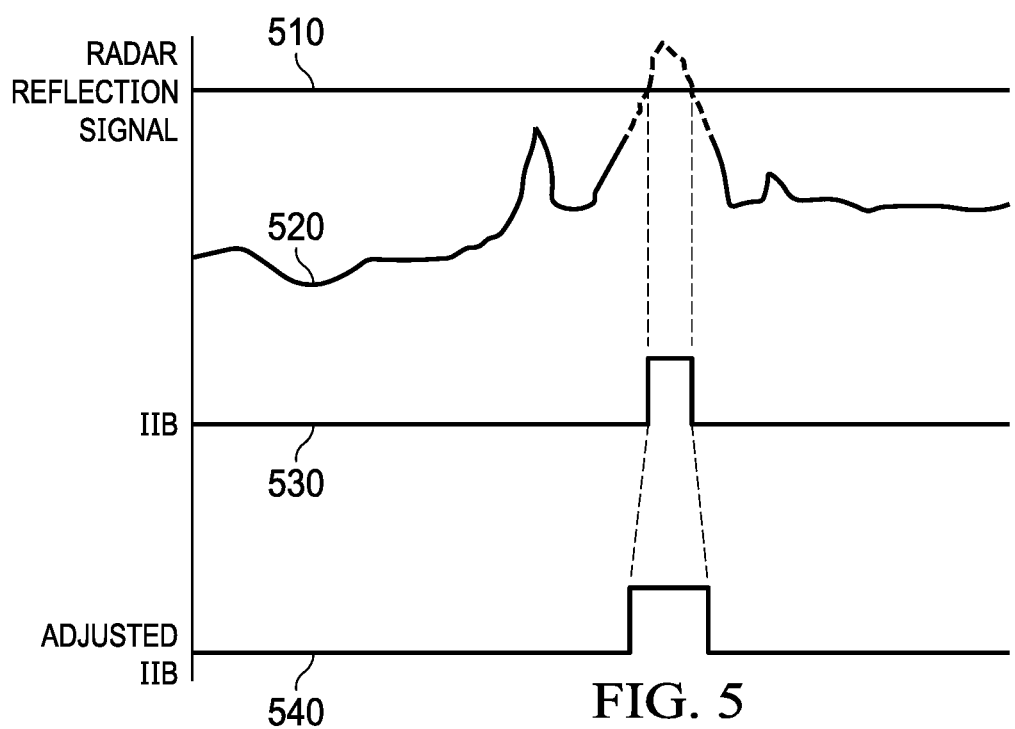
FIG. 5 is a graphical depiction of an implementation.

Looking at FIG. 5, different configuration settings are depicted. Radar reflection signal 520 only crosses threshold 510 in one location. In an implementation, the interference threshold 510 is set comparatively higher, such that fewer IIBs will be set to indicate interference. The L and R buffer size may be set to 3 samples each. This would provide an IIB buffer size of 7 samples. The IIB threshold comparator may be set to 1. Thus, if any sample within the 7 samples is correlated with an interference indication (shown in IIB Input 530), the adjusted IIB (IIB output 540) would show interference. In this manner, the adjusted IIB signal 540 may be asserted for longer than the IIB signal 530 and may indicate more samples of the radar reflection signal 520 are associated with interference.

Figure 6:
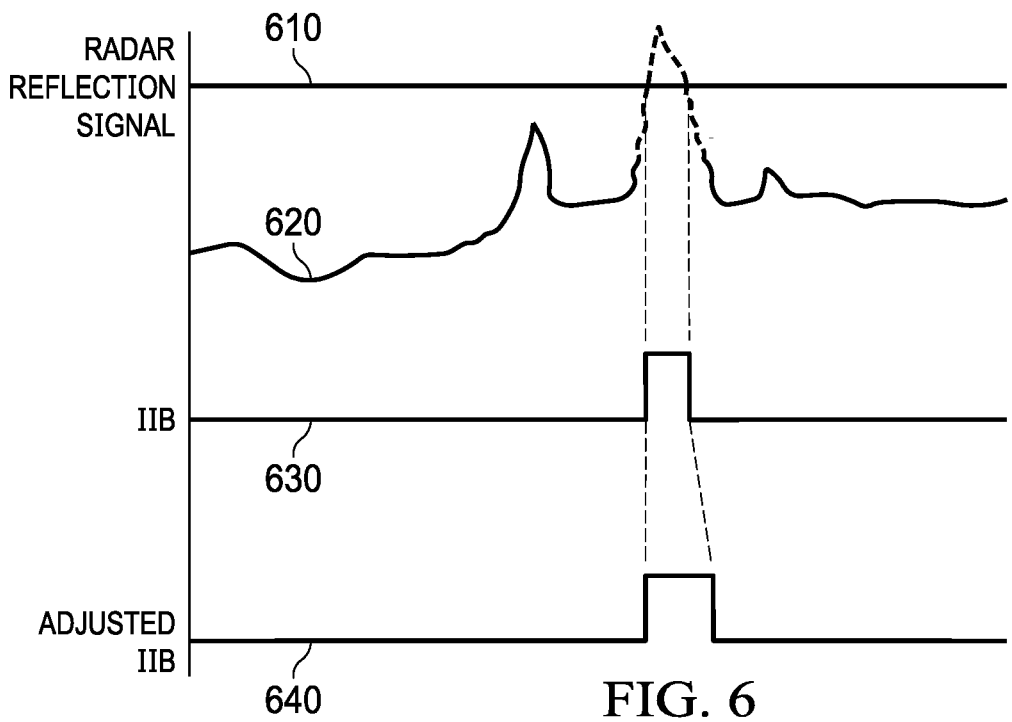
FIG. 6 is a graphical depiction of an implementation.

Turning to FIG. 6, in an implementation, it may be desirable to have an asymmetric buffer. For example, if the radar reflection signal 610 includes asymmetric glitches, then it may be beneficial to use an asymmetric buffer. In FIG. 6, a relatively high interference threshold is set, such that the radar reflection signal 520 only crosses the interference threshold 510 in one place. The glitch where radar reflection signal 520 crosses interference threshold 510 is asymmetric. Where radar reflection signal 520 crosses interference threshold 510, IIB input 630 is set to indicate interference. The IIB buffer may be set so that L=0 and R=3. The IIB threshold comparator may be set to 1. Thus, if there is any indication of interference within the IIB buffer (4 samples), the IIB output 640 will be set to indicate interference.

Figure 7:
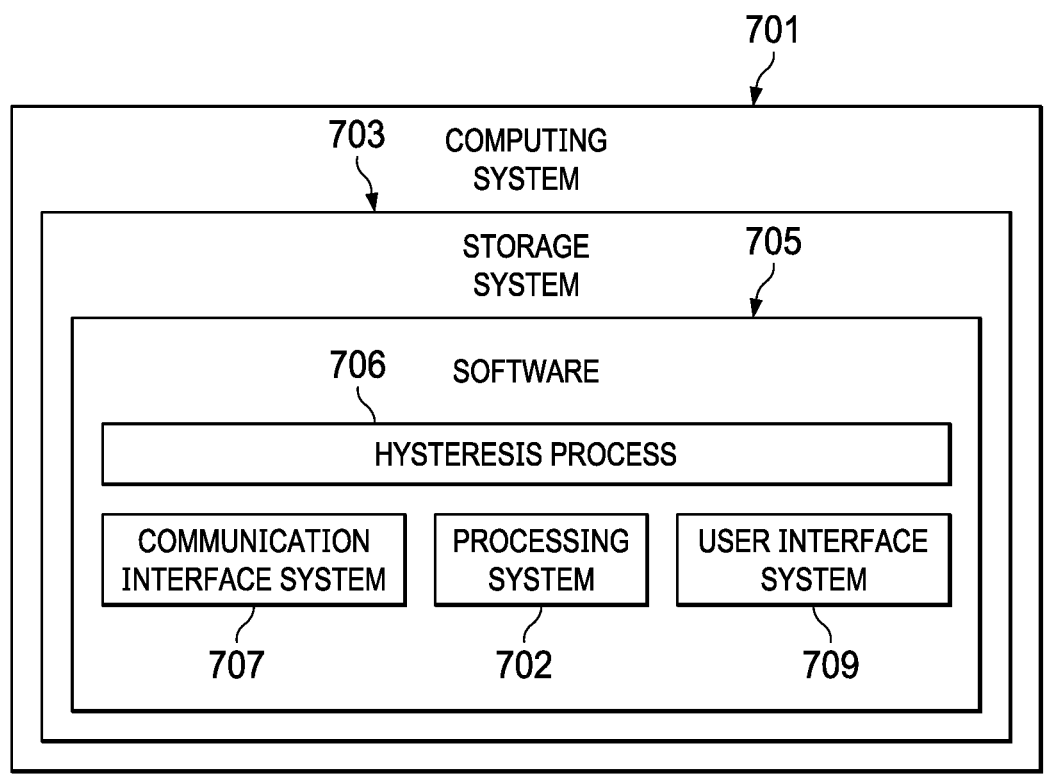
FIG. 7 is a functional view of a system suitable for implementing an implementation.

FIG. 7 illustrates computing system 701 that is representative of any system or collection of systems in which the various processes, programs, services, and scenarios disclosed herein may be implemented. Examples of computing system 701 include, but are not limited to, integrated circuits, SOCs, server computers, routers, web servers, cloud computing platforms, and data center equipment, as well as any other type of physical or virtual server machine, physical or virtual router, container, and any variation or combination thereof.

Computing system 701 may be implemented as a single apparatus, system, or device or may be implemented in a distributed manner as multiple apparatuses, systems, or devices. Computing system 701 includes, but is not limited to, processing system 702, storage system 703, software 705, communication interface system 707, and user interface system 709 (optional). Processing system 702 is operatively coupled with storage system 703, communication interface system 707, and user interface system 709.

Processing system 702 loads and executes software 705 from storage system 703. Software 705 includes and implements hysteresis process 706, which is representative of the hysteresis processes discussed with respect to the preceding Figures. When executed by processing system 702, software 705 directs processing system 702 to operate as described herein for at least the various processes, operational scenarios, and sequences discussed in the foregoing implementations. Computing system 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device but may also be distributed across multiple processing devices or sub-systems that cooperate in executing program instructions. Examples of processing system 702 include general purpose central processing units, graphical processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable, and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device but may also be implemented across multiple storage devices or sub-systems co-located or distributed relative to each other. Storage system 703 may comprise additional elements, such as a controller, capable of communicating with processing system 702 or possibly other systems.

Software 705 (including hysteresis process 706) may be implemented in program instructions and among other functions may, when executed by processing system 702, direct processing system 702 to operate as described with respect to the various operational scenarios, sequences, and processes illustrated herein. For example, software 705 may include program instructions for implementing a connection process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtualization software, or other application software. Software 705 may also comprise firmware or some other form of machine-readable processing instructions executable by processing system 702.

In general, software 705 may, when loaded into processing system 702 and executed, transform a suitable apparatus, system, or device (of which computing system 701 is representative) overall from a general-purpose computing system into a special-purpose computing system customized to establish connections and handle content as described herein. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A frequency modulated continuous wave (FMCW) radar system, comprising:
a receiver configured to receive a radar reflection signal; and
processing circuitry configured to:
identify first portions of the radar reflection signal that exceed an interference threshold, identify second portions of the radar reflection signal that do not exceed the interference threshold, and generate a threshold indicator signal having a threshold indicator for each identified first portion and for each identified second portion;
identify a transition segment of the radar reflection signal, in which the transition segment includes at least one first portion and at least one second portion, wherein the transition segment is associated with an active threshold indicator and n−1 other threshold indicators, and n is an integer of 3 or greater;
modify the active threshold indicator based at least in part on the n threshold indicators associated with the transition segment, and output a modified threshold indicator signal, in which the modified active threshold indicator indicates one of: the first portion of the radar reflection signal previously so identified by the active threshold indicator is not associated with interference, and the second portion of the radar reflection signal previously so identified by the active threshold indicator is associated with interference; and
mitigate interference in the radar reflection signal based at least in part on the modified threshold indicator signal.

2. The frequency modulated continuous wave (FMCW) radar system of claim 1, wherein, for each identified first portion, the processing circuitry is configured to generate, as the threshold indicator, a first binary value and, for each identified second portion, the processing circuitry is configured to generate, as the threshold indicator, a second binary value, wherein the first and second binary values are different.

3. The frequency modulated continuous wave (FMCW) radar system of claim 2, wherein the threshold indicator signal over time that is correlated with the radar reflection signal.

4. The frequency modulated continuous wave (FMCW) radar system of claim 3, wherein n is set by a hysteresis configuration of the system.

5. The frequency modulated continuous wave (FMCW) radar system of claim 3, wherein the n threshold indicators includes (n−1)/2 threshold indicators before the active threshold indicator and (n−1)/2 threshold indicators after the active threshold indicator.

6. The frequency modulated continuous wave (FMCW) radar system of claim 3, wherein the n threshold indicators includes x threshold indicators before the active threshold indicator, and y threshold indicators after the active threshold indicator, wherein x and y are integers, x and y are unequal, and n=x+y+1.

7. The frequency modulated continuous wave (FMCW) radar system of claim 3, wherein the first binary value is 1 and the second binary value is 0, and the processing circuitry is further configured to modify the active threshold indicator based on a sum of the binary values of the n threshold indicators.

8. The frequency modulated continuous wave (FMCW) radar system of claim 4, wherein the hysteresis configuration is configured to adjust automatically, based at least in part on the radar reflection signal.

9. The frequency modulated continuous wave (FMCW) radar system of claim 4, wherein the hysteresis configuration is configured to adjust automatically, based at least in part on the threshold indicator signal.

10. A method, comprising:
receiving a stream of indicators, including first indicators identifying respective first portions of a radar reflection signal that exceed an interference threshold and second indicators identifying respective second portions of the radar reflection signal that do not exceed the threshold;
identifying a transition segment of the radar reflection signal, in which the transition segment includes at least one first portion and at least one second portion, wherein the transition segment is associated with an active indicator and n−1 other indicators, and n is an integer of 3 of greater;
modifying the active indicator based at least in part on the n indicators associated with the transition segment, and output a modified stream of first and second indicators, in which the modified active indicator is one of: changed from a first indicator to a second indicator to indicate that the corresponding first portion of the radar reflection signal is not associated with interference, and changed from a second indicator to a first indicator to indicate the corresponding second portion of the radar reflection signal is associated with interference; and
processing the radar reflection signal to mitigate interference in the radar reflection signal based at least in part on the modified stream of first and second indicators.

11. The method of claim 10, wherein the modified stream of first and second indicators represents an interference signal that correlates in time with the radar reflection signal.

12. The method of claim 11, wherein n is set by a hysteresis configuration to include (n−1)/2 indicators before the active indicator and (n−1)/2 indicators after the active indicator.

13. The method of claim 11, wherein n is set by a hysteresis configuration to include x indicators before the active indicator, and y indicators after the active indicator, wherein x and y are integers, x and y are unequal, and n=x+y+1.

14. The method of claim 10, wherein each first indicator is a binary 1 and each second indicator is a binary 0, the active indicator is a first indicator, and the modifying includes changing the binary value of the subject indicator from 1 to 0 based on a sum of the binary values of the n indicators being less than a set value.

15. The method of claim 10, wherein each first indicator is a binary 1 and each second indicator is a binary 0, the active indicator is a second indicator, and the modifying includes changing the binary value of the subject indicator from 0 to 1 based on a sum of the binary values of the n indicators being greater than a set value.

16. An integrated circuit, comprising:
a processor and memory, the memory storing instructions thereon, which, when executed by the processor, cause the integrated circuit to:
receive indicators including first indicators identifying respective first portions of a radar reflection signal that exceed an interference threshold and second indicators identifying respective second portions of the radar reflection signal that do not exceed the interference threshold;
identify a transition segment of the radar reflection signal, in which the transition segment includes at least one first portion and at least one second portion, wherein the transition segment is associated with an active indicator and n−1 other indicators, and n is an integer of 3 of greater;
changing the active indicator based on the n indicators associated with the transition segment from one of: a first indicator to a second indicator to indicate that the corresponding first portion of the radar reflection signal is not associated with interference, and a second indicator to a first indicator to indicate that the corresponding second portion of the radar reflection signal is associated with interference; and
process the radar reflection signal to mitigate the interference in the radar reflection signal based at least in part on the changed active indicator.

17. The integrated circuit of claim 16, wherein the first and second indicators represent an interference signal that correlates in time with the radar reflection signal.

18. The integrated circuit of claim 17, wherein n is set by a hysteresis configuration that is adjustable based at least in part on at least one of the radar reflection signal and the interference signal.

19. The integrated circuit of claim 17, wherein the n indicators includes (n−1)/2 indicators before the active indicator and (n−1)/2 indicators after the active indicator.

20. The integrated circuit of claim 17, wherein the n indicators includes (n−1)/2 indicators before the active indicator and (n−1)/2 indicators after the active indicator.

* * * * *